(12) United States Patent
Mullaney et al.

(10) Patent No.: US 7,359,613 B2
(45) Date of Patent: Apr. 15, 2008

(54) OPTICAL FIBER TERMINATION APPARATUS FOR TAUT SHEATH SPLICING AND METHOD FOR USING THE SAME

(75) Inventors: Julian Mullaney, Raleigh, NC (US); William Alan Carrico, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/438,559

(22) Filed: May 22, 2006

(65) Prior Publication Data

US 2006/0269209 A1    Nov. 30, 2006

Related U.S. Application Data

(60) Provisional application No. 60/685,673, filed on May 27, 2005.

(51) Int. Cl.
*G02B 6/00* (2006.01)

(52) U.S. Cl. .......................... 385/139; 385/55; 385/76; 385/135

(58) Field of Classification Search ............ 385/55–60, 385/69, 75–78, 86, 135, 139
See application file for complete search history.

(56) References Cited

U.S. PATENT DOCUMENTS

| | | | |
|---|---|---|---|
| 5,440,665 A | 8/1995 | Ray et al. | 385/135 |
| 5,449,299 A | 9/1995 | Shimirak et al. | 439/417 |
| 5,528,718 A | 6/1996 | Ray et al. | 385/136 |
| 5,657,413 A | 8/1997 | Ray et al. | 385/139 |
| 6,579,014 B2 | 6/2003 | Melton et al. | 385/78 |
| 6,648,520 B2 | 11/2003 | McDonald et al. | 385/78 |
| 7,130,519 B2 * | 10/2006 | Grubish et al. | 385/135 |
| 2001/0036342 A1 | 11/2001 | Kneecht et al. | 385/84 |
| 2002/0057870 A1 | 5/2002 | Dean, Jr. et al. | 385/28 |
| 2003/0063866 A1 | 4/2003 | Melton et al. | 385/76 |
| 2003/0081910 A1 | 5/2003 | Gimbel et al. | 385/80 |
| 2003/0103750 A1 | 6/2003 | Laporte et al. | 385/134 |
| 2003/0123812 A1 | 7/2003 | Beatty et al. | 385/72 |
| 2003/0210871 A1 | 11/2003 | Rosson et al. | 385/78 |
| 2003/0235374 A1 | 12/2003 | Luther et al. | 385/85 |
| 2004/0047566 A1 | 3/2004 | McDonald et al. | 385/78 |
| 2004/0047567 A1 | 3/2004 | Gimbel et al. | 385/80 |
| 2004/0101255 A1 | 5/2004 | Dean, Jr. | 385/85 |
| 2004/0114874 A1 | 6/2004 | Bono et al. | 385/53 |
| 2004/0120656 A1 | 6/2004 | Banas et al. | 385/86 |

(Continued)

*Primary Examiner*—Frank G. Font
*Assistant Examiner*—Hung Lam
(74) *Attorney, Agent, or Firm*—Myers, Bigel, Sibley & Sajovec

(57) ABSTRACT

An optical fiber termination apparatus for taut sheath splicing includes a housing configured to be positioned around a section of an optical fiber cable with an uncut strength member of the optical fiber cable or a plurality of uncut and un-looped optical fibers extending therethrough. The housing has a first opening at a first end thereof for receiving the optical fiber cable and a second opening at a longitudinally displaced second end thereof for receiving the optical fiber cable. An optical fiber connector positioned in a wall of the housing optically couples an optical fiber from the optical fiber cable to a front fiber connection member of the optical fiber connector accessible from outside the housing. Methods of terminating optical fiber using optical fiber termination apparatus are also provided.

24 Claims, 16 Drawing Sheets

U.S. PATENT DOCUMENTS

| | | |
|---|---|---|
| 2004/0123998 A1 | 7/2004 | Berglund et al. .............. 174/92 |
| 2004/0126069 A1 | 7/2004 | Jong et al. .................. 385/189 |
| 2004/0152354 A1 | 8/2004 | Luther et al. ................ 439/378 |
| 2004/0252960 A1 | 12/2004 | Battey et al. ................ 385/135 |
| 2005/0031285 A1 | 2/2005 | Barnes et al. ................ 385/134 |
| 2005/0036742 A1 | 2/2005 | Dean, Jr. et al. .............. 385/71 |
| 2005/0041926 A1 | 2/2005 | Elkins et al. .................. 385/53 |
| 2005/0069264 A1 | 3/2005 | Luther et al. .................. 385/59 |
| 2005/0105873 A1 | 5/2005 | Reagan et al. ............... 385/135 |
| 2005/0111799 A1 | 5/2005 | Cooke et al. ................. 385/100 |
| 2005/0111800 A1 | 5/2005 | Cooke et al. ................. 385/100 |
| 2005/0129375 A1 | 6/2005 | Elkins et al. ................. 385/100 |
| 2005/0129379 A1 | 6/2005 | Reagan et al. ............... 385/135 |
| 2005/0145522 A1 | 7/2005 | Bloodworth et al. ........ 206/409 |
| 2005/0163448 A1 | 7/2005 | Blackwell, Jr. .............. 385/135 |
| 2005/0175307 A1* | 8/2005 | Battey et al. ................ 385/135 |
| 2005/0175308 A1 | 8/2005 | Elkins, II et al. ............ 385/135 |
| 2005/0180705 A1 | 8/2005 | Elkins, II et al. ............ 385/100 |
| 2005/0185895 A1 | 8/2005 | Keenum et al. ................ 385/76 |
| 2005/0185910 A1 | 8/2005 | Zimmel ....................... 385/135 |
| 2005/0207711 A1 | 9/2005 | Vo et al. ........................ 385/94 |
| 2005/0220421 A1 | 10/2005 | Keenum et al. ................ 385/62 |
| 2005/0232567 A1 | 10/2005 | Reagan et al. ............... 385/135 |
| 2006/0115220 A1* | 6/2006 | Elkins et al. .................. 385/87 |
| 2006/0133759 A1* | 6/2006 | Mullaney et al. ............ 385/139 |
| 2006/0280420 A1* | 12/2006 | Blackwell et al. ........... 385/135 |

* cited by examiner

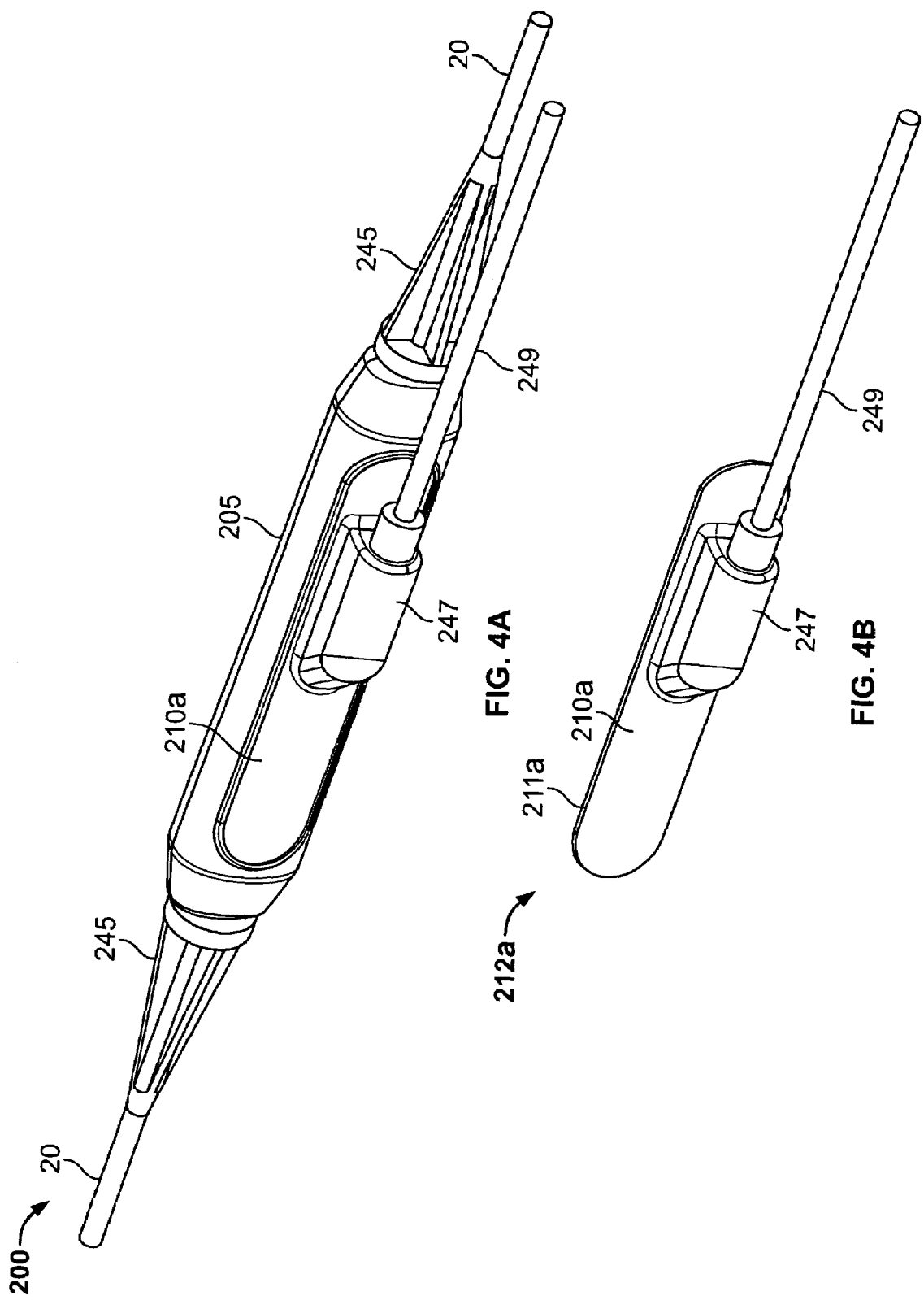

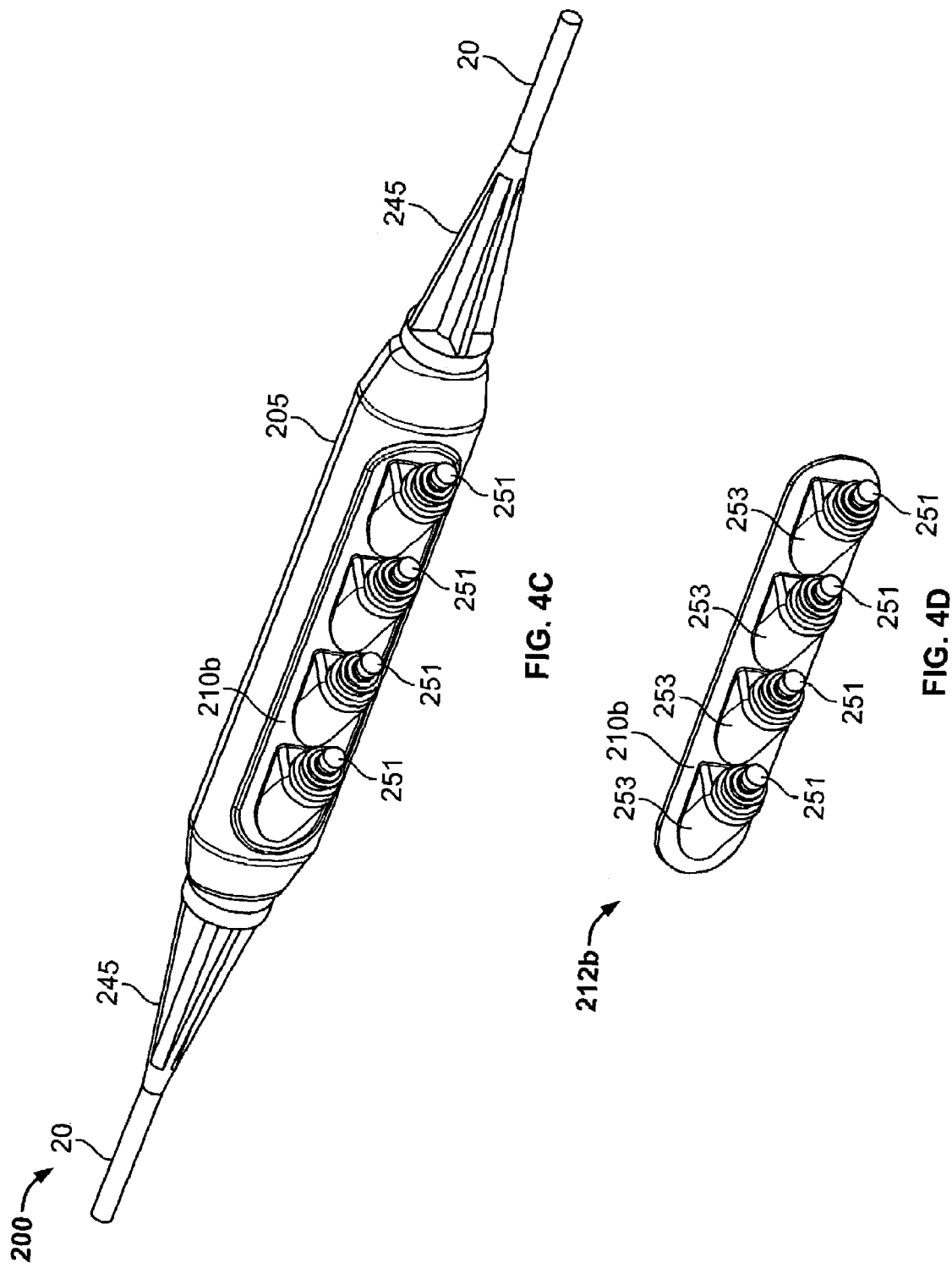

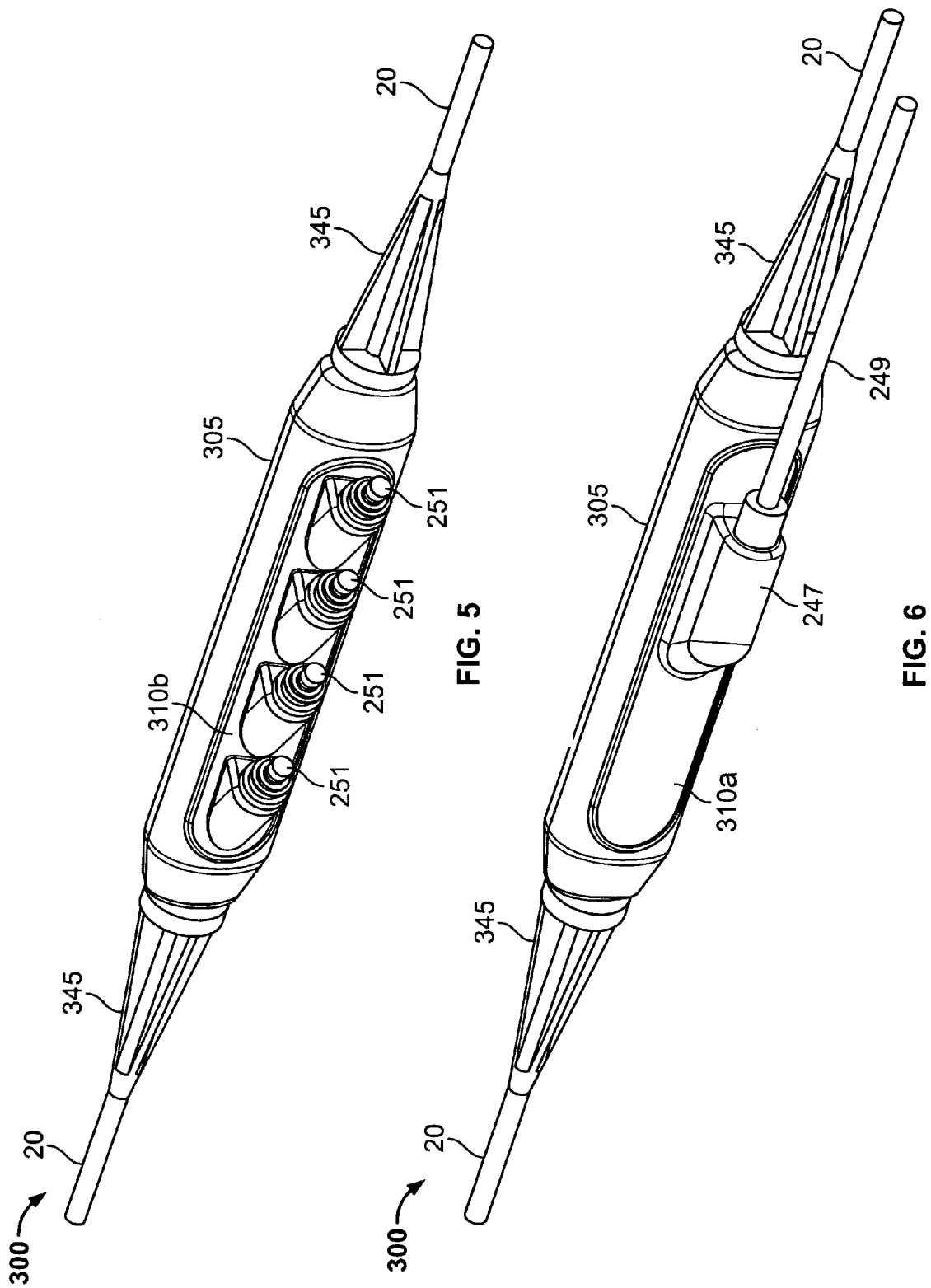

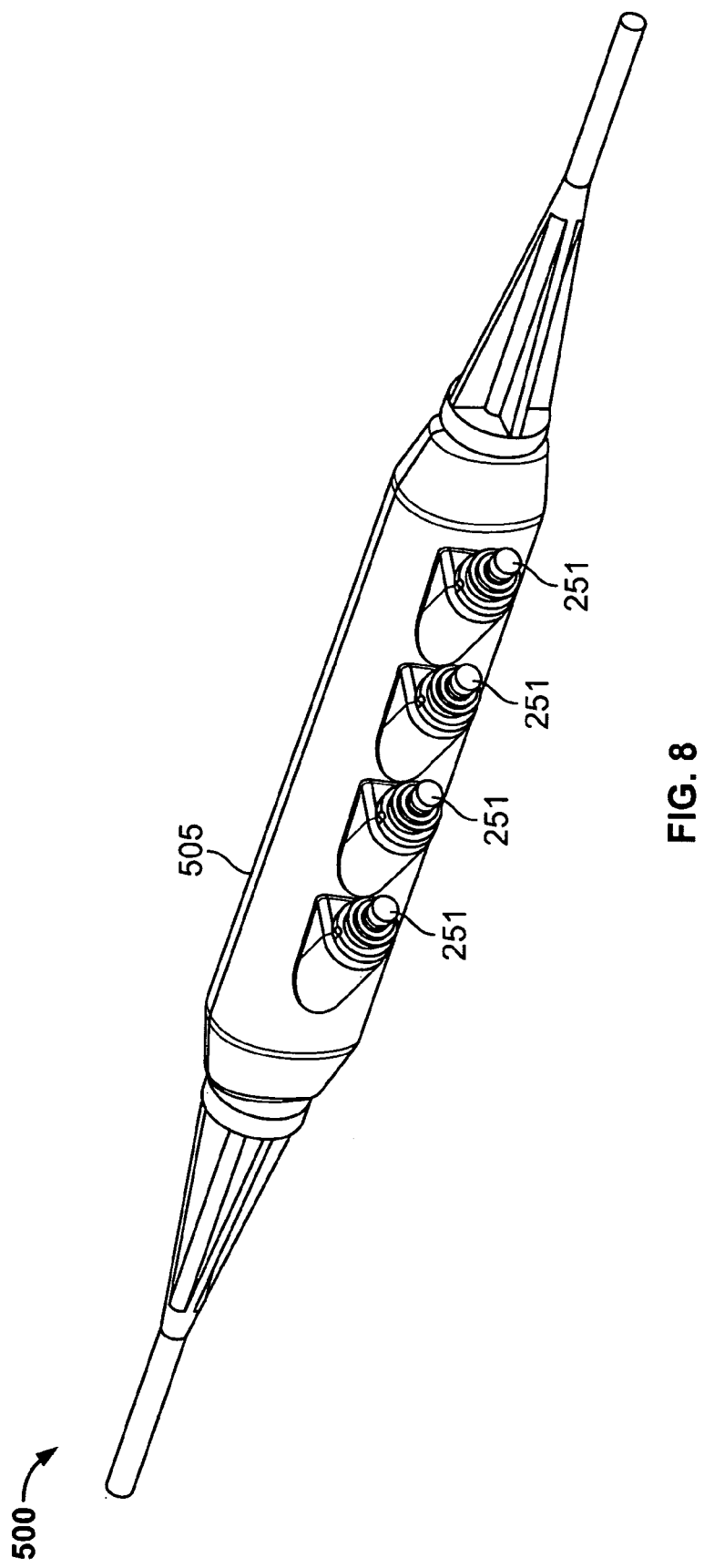

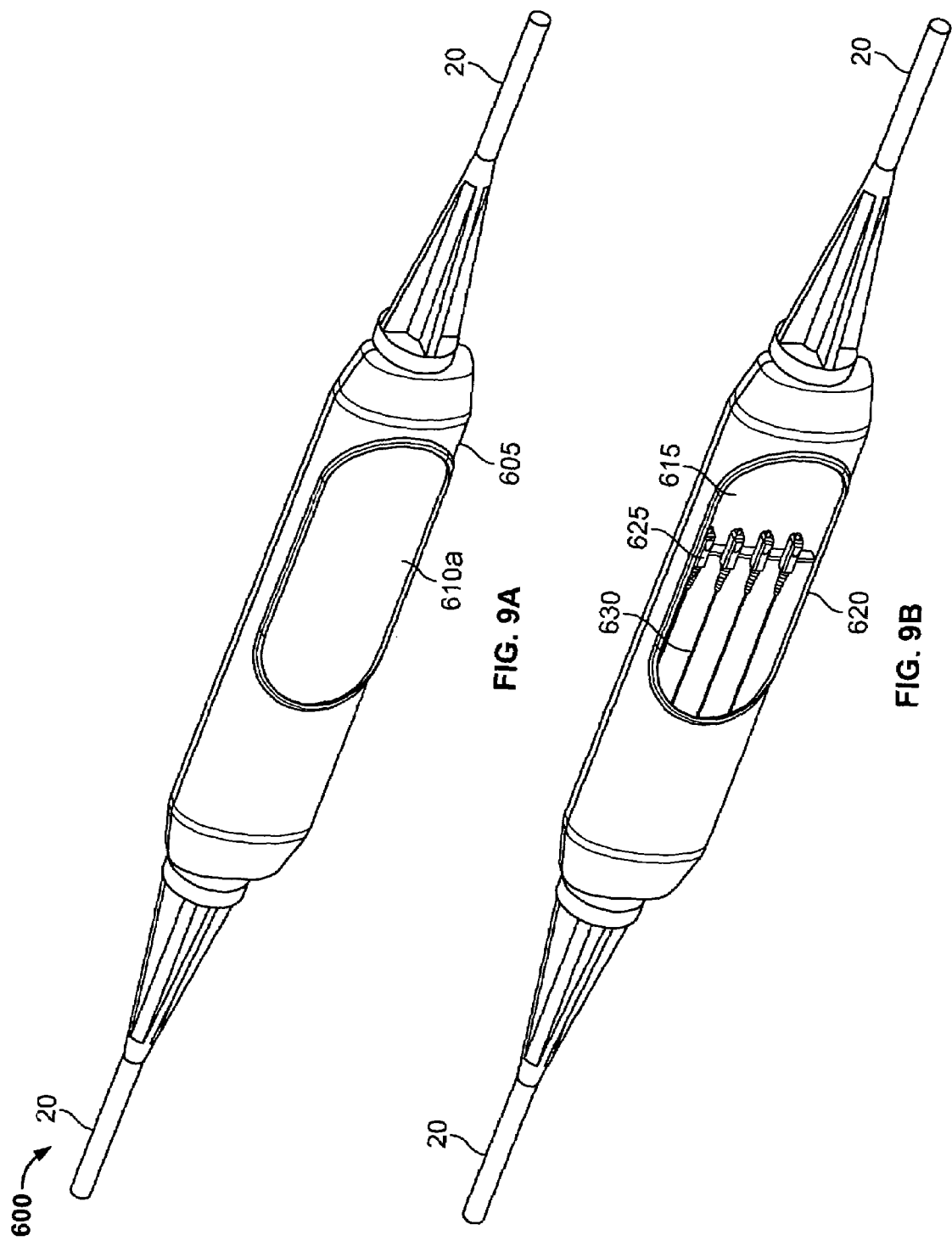

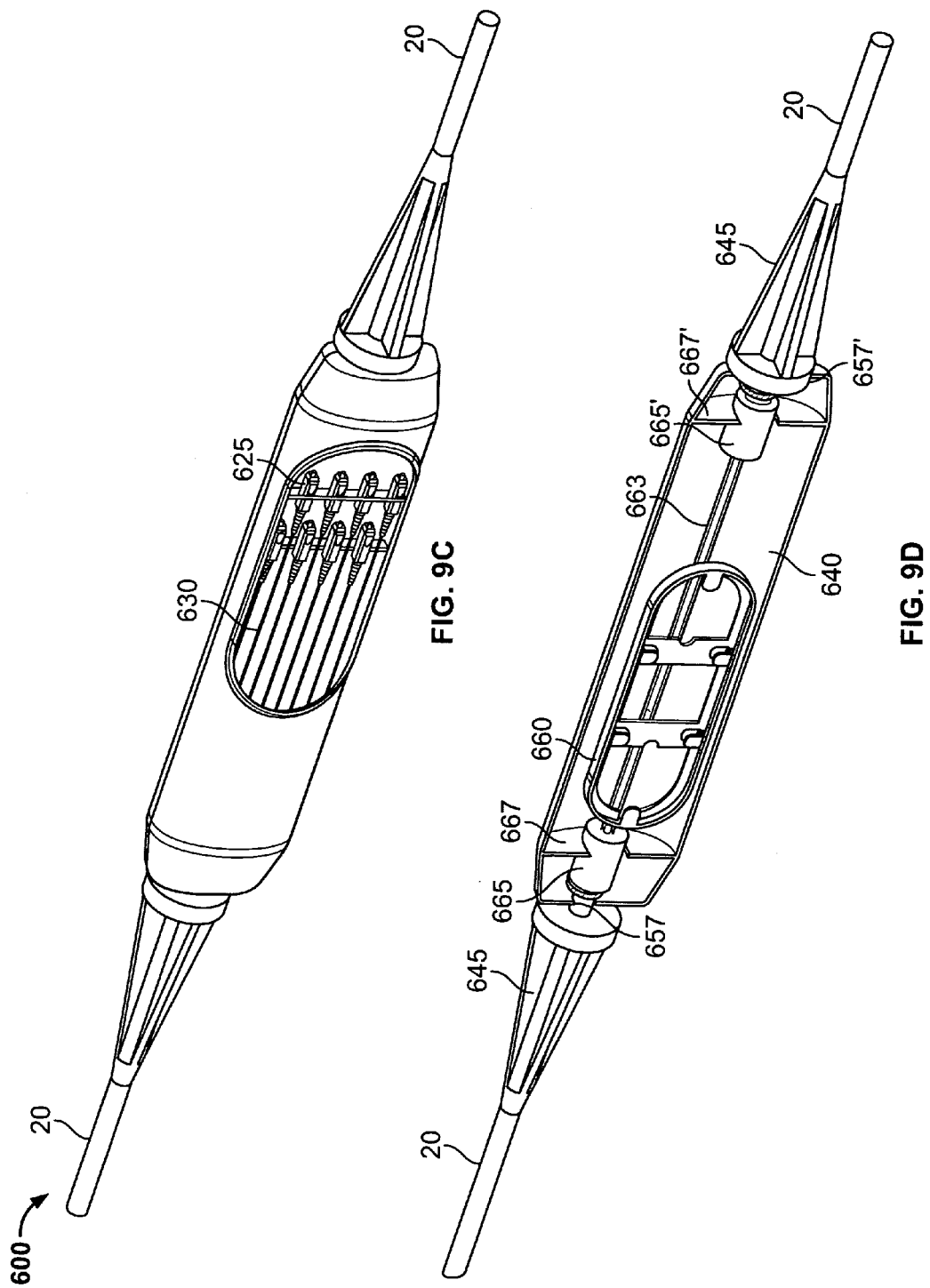

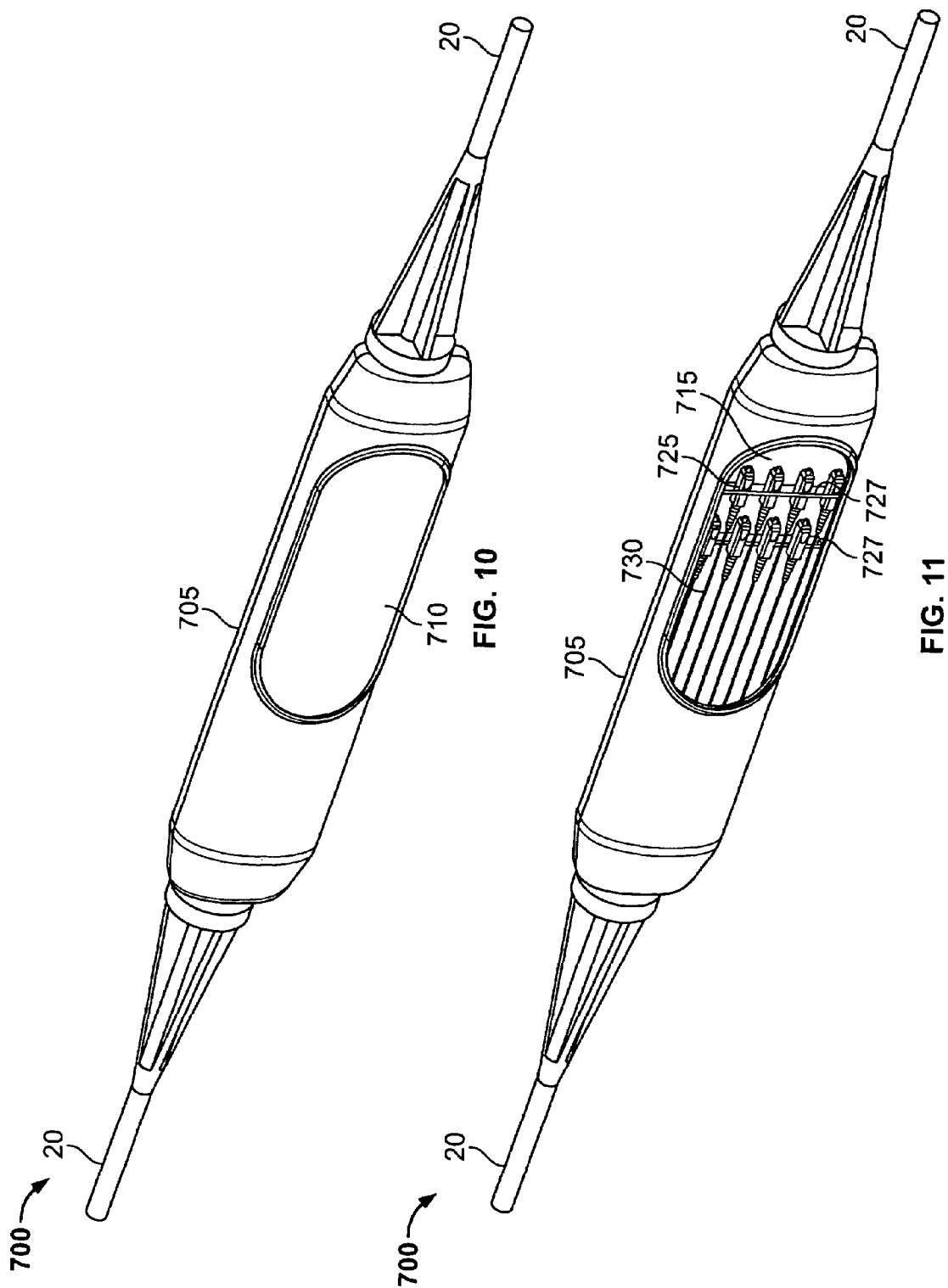

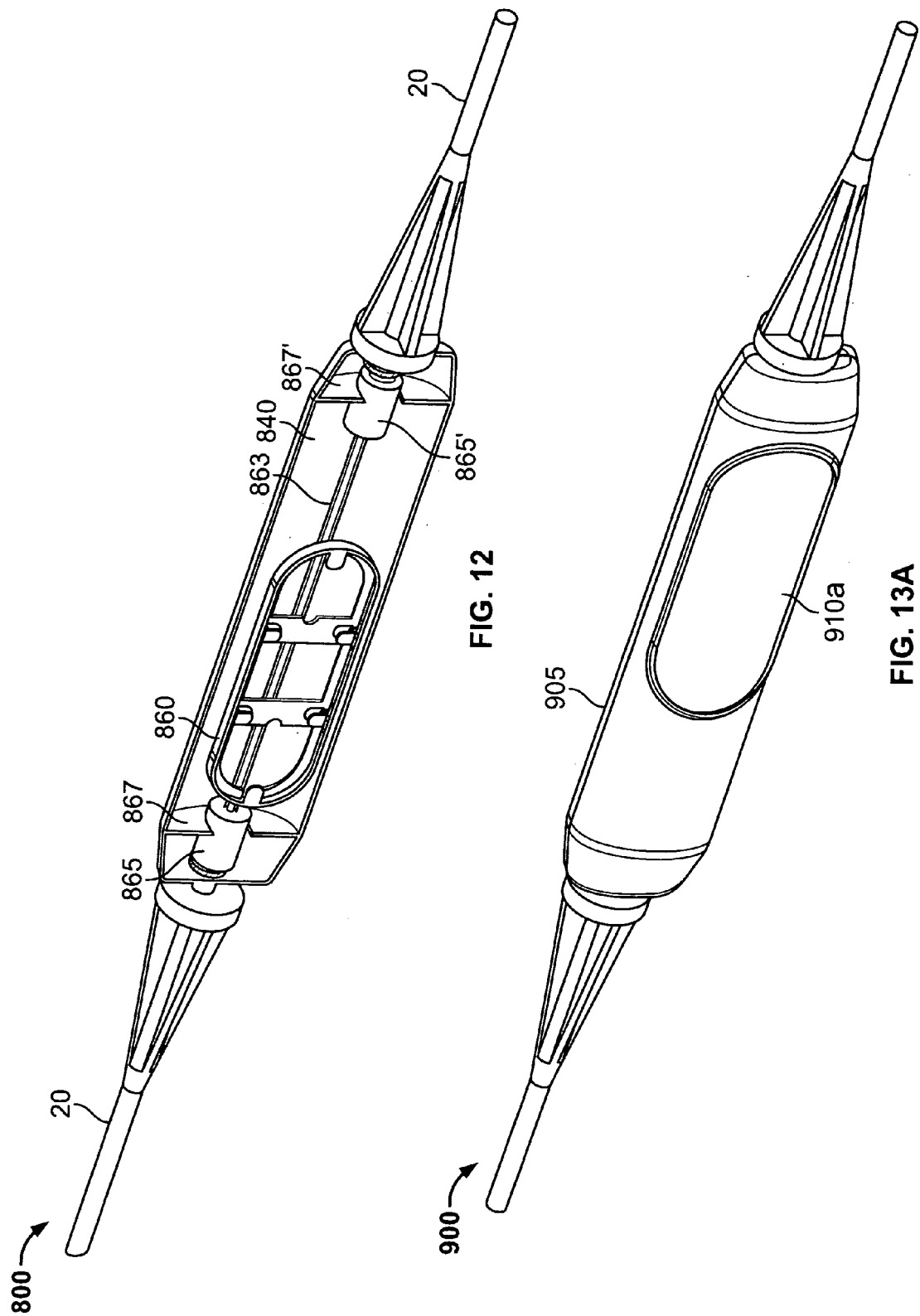

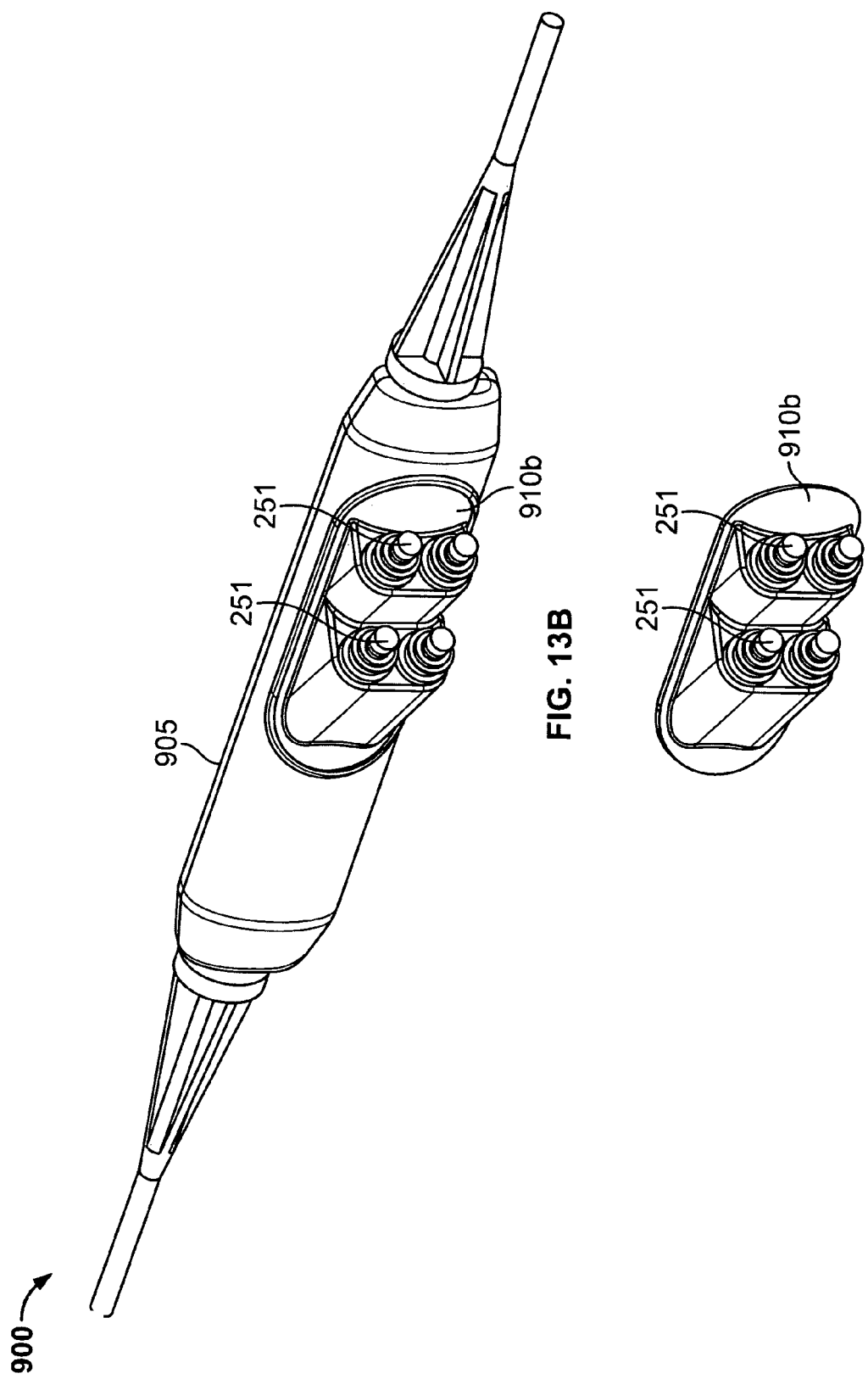

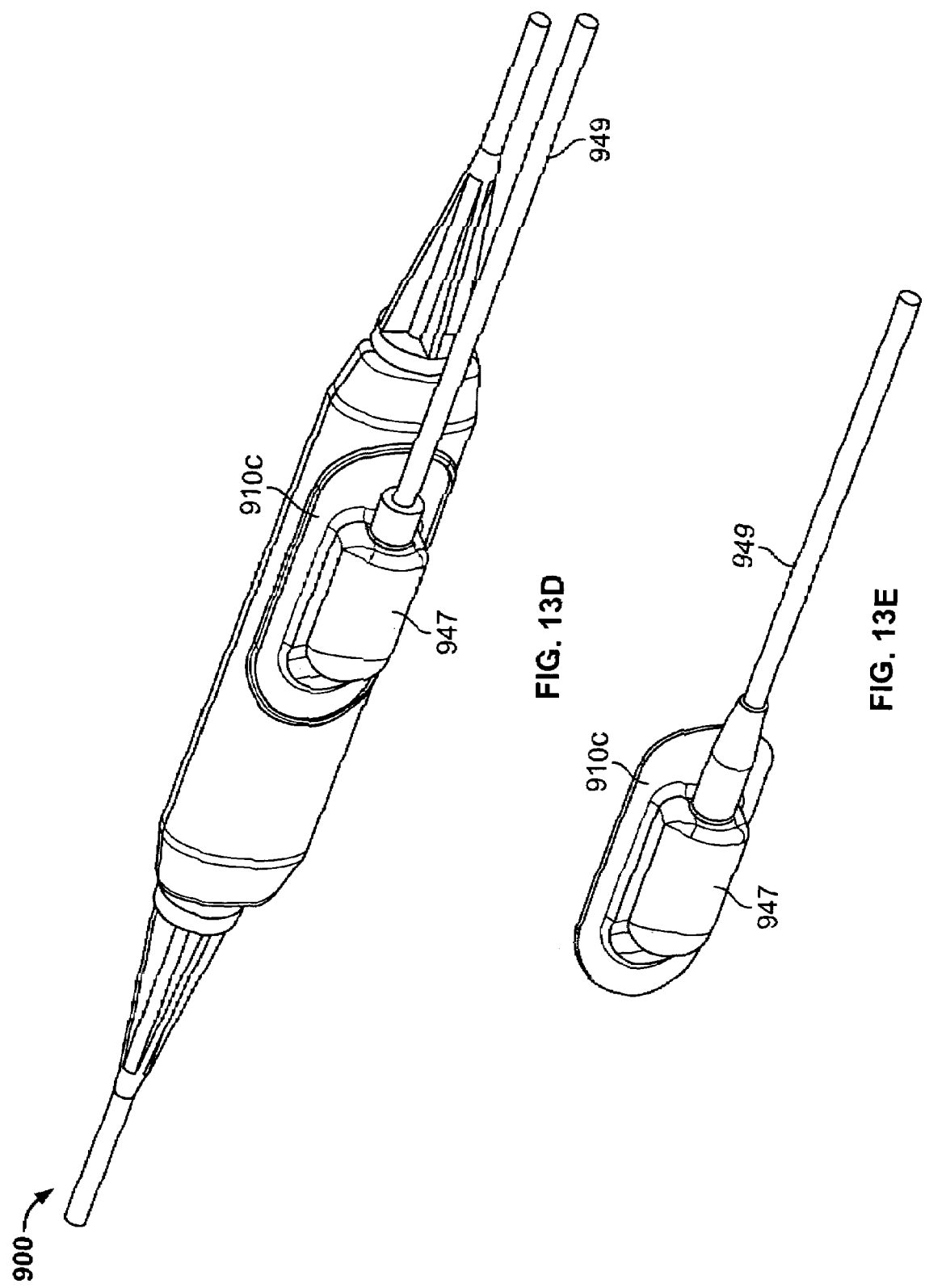

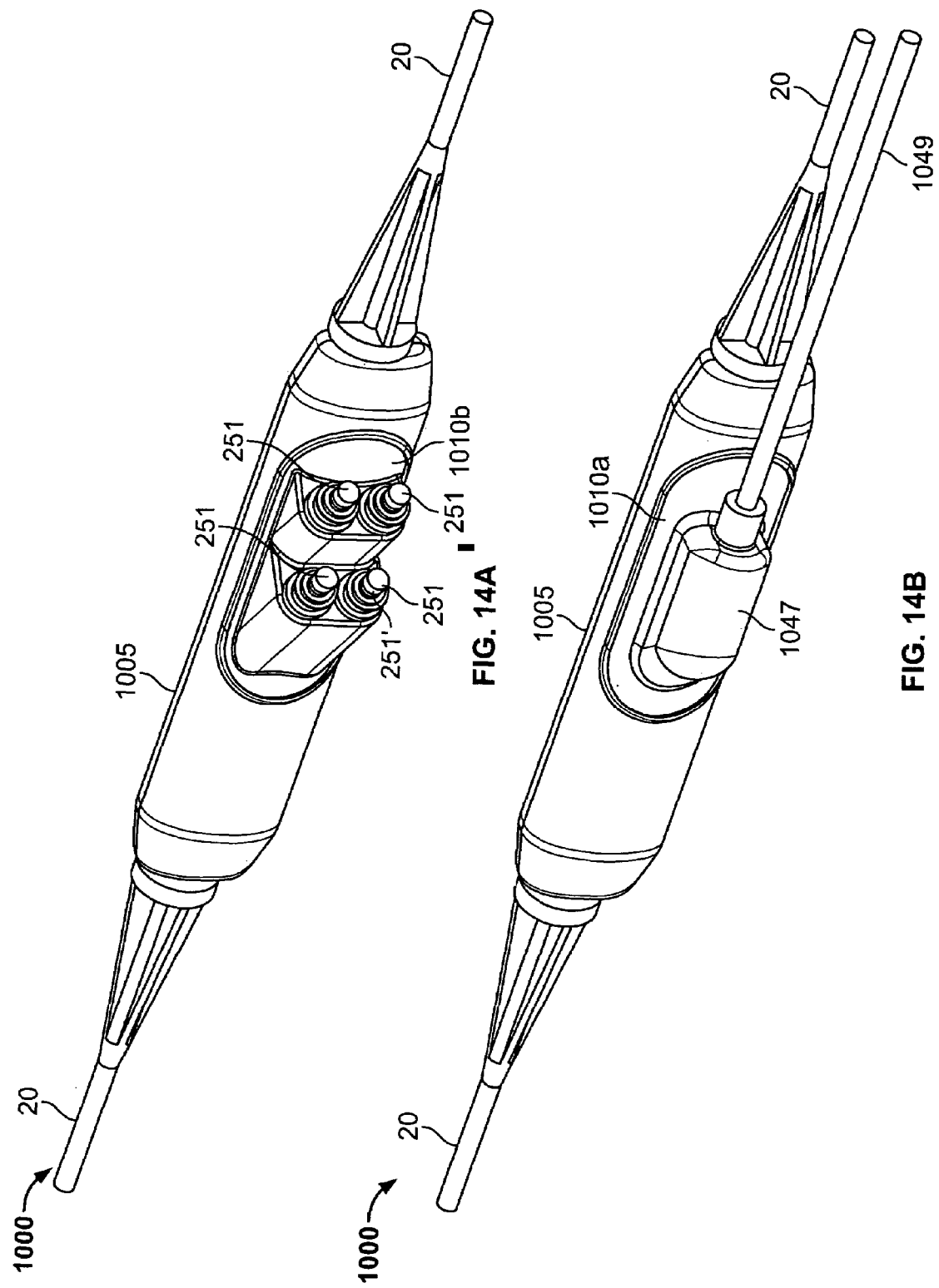

OPTICAL FIBER TERMINATION APPARATUS FOR TAUT SHEATH SPLICING AND METHOD FOR USING THE SAME

RELATED APPLICATIONS

The present application claims priority from U.S. Provisional Application No. 60/685,673, filed May 27, 2005, the disclosure of which is hereby incorporated herein in its entirety by reference.

BACKGROUND OF THE INVENTION

The present invention relates to communication cable termination devices and, more particularly, to optical fiber termination apparatus and methods for using the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems. However, this cable based infrastructure is generally required to be flexibly field installed to allow for additions and deletions of service at access points as the customer mix for a telecommunications provider changes. Accordingly, subscriber optical fiber drop cable access points are typically required for configuring the network to provide services to different customers.

For the optical fiber infrastructure, it is generally desirable to provide sealed environmental protection and flexible incremental connection of subscriber drop cables to provide for rapid and reduced cost deployment of services to different customers. A variety of different products are available for use at access points in optical fiber-based communications networks. For example, the OptiSheath™ Advantage Terminal, available from Corning Incorporated of Corning, N.Y., is available with customer options to accommodate add-as-you-grow applications. The OptiSheath™ is available in six, eight or twelve port customer options, which may be utilized for aerial or buried terminal use in an optical access architecture allowing for subscriber connection. Cables of varying lengths may be preterminated inside the factory for use in the OptiSheath™ Advantage Terminal and the multiport options may allow for configuration in the field of each terminal location based on customer take length and stub length. The actual connection point in the OptiSheath™ Advantage Terminal utilizes a specific tap and drop cable specification to provide for the actual subscriber drop cable installation at the OptiSheath™ Advantage Terminal. In particular, the OptiTap™ Connector is included in the OptiSheath™ Advantage Terminal and the OptiFit™ Drop Cable may be removably coupled through the OptiTap™ to link subscribers to the optical fiber communications network. Utilization of such a standard connector type infrastructure may provide for rapid installation of fiber optic cables. However, there is a risk with such a configuration that a loss of environmental seal on any one port may expose other ports within a terminal to environmental contamination and associated degradation.

The terminal also may be bulky and difficult to utilize with inside factory pretermination and may drive up the initial installation cost by including all connectors initially when only a limited number of subscribers may yet have been signed on for service.

BRIEF DESCRIPTION OF THE DRAWINGS

FIGS. 4A-4D are perspective views of an optical fiber termination apparatus according to some embodiments of the present invention;

FIGS. 5 and 6 are perspective views of an optical fiber termination apparatus according to some embodiments of the present invention;

FIG. 8 is a perspective view of the optical fiber termination apparatus of FIGS. 7A and 7B;

FIGS. 9A-9D are perspective views of an optical fiber termination apparatus according to some embodiments of the present invention;

FIGS. 10-12 are perspective views an optical fiber termination apparatus according to some embodiments of the present invention;

FIGS. 13A-13E are perspective views of an optical fiber termination apparatus according to some embodiments of the present invention;

FIGS. 14A and 14B are perspective views illustrating an optical fiber termination apparatus according to further embodiments of the present invention.

DETAILED DESCRIPTION

Figure 1:
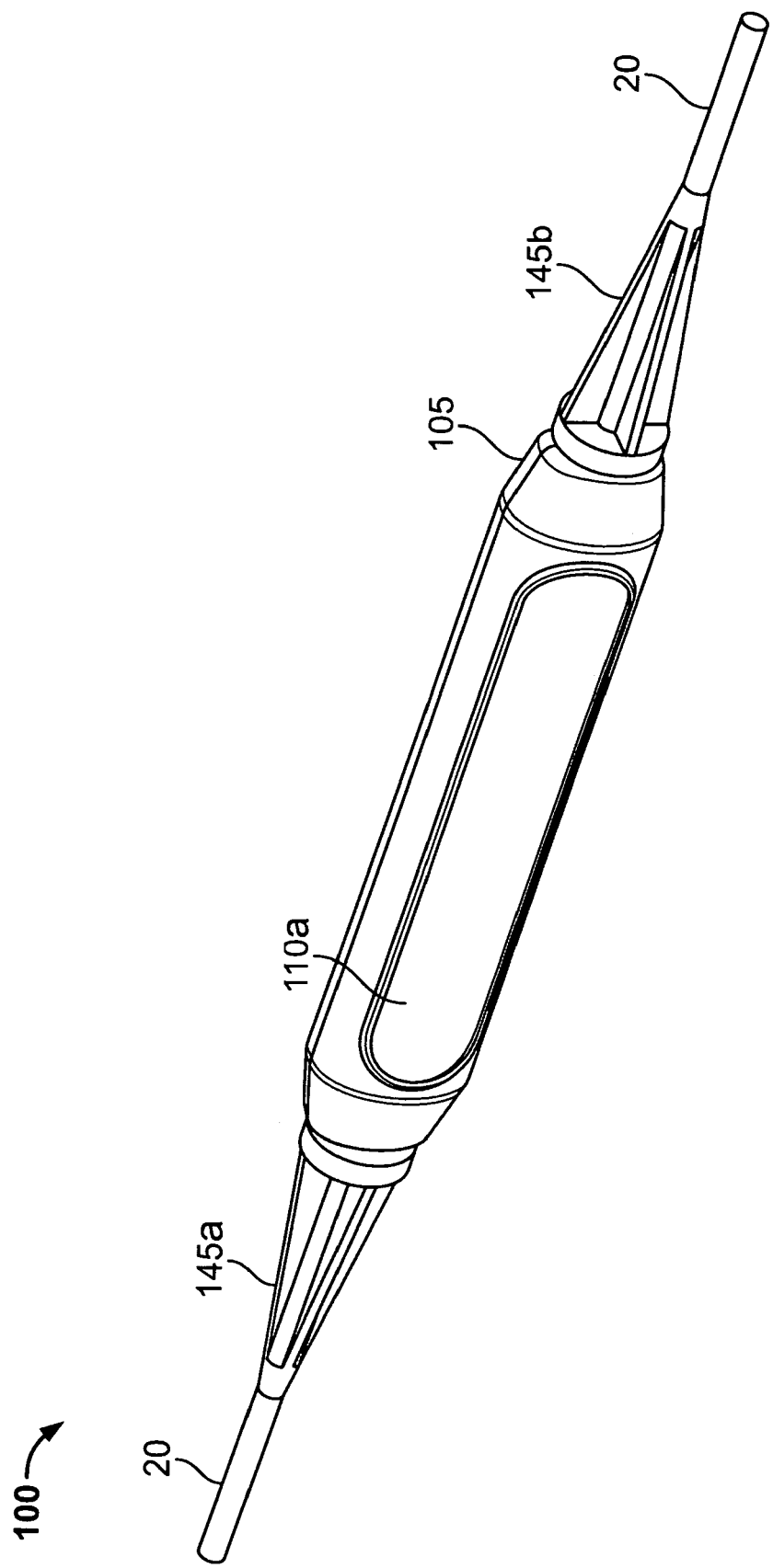
FIG. 1 is a perspective view illustrating an optical fiber termination apparatus according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention provide an optical fiber termination apparatus for taut sheath splicing. The apparatus includes a housing configured to be positioned around a section of an optical fiber cable with an uncut strength member of the optical fiber cable and/or a plurality of uncut and un-looped fibers of the optical fiber cable extend through the housing. The housing has a first opening at a first end thereof for receiving the optical fiber cable and a second opening at a longitudinally displaced second end thereof for receiving the optical fiber cable. A severed fiber chamber in the housing is configured to receive ends, which may be connectorized ends, of at least one optical fiber from the optical fiber cable. A fiber access opening in a face of the housing between the first and second end of the housing opens to the severed fiber chamber. The fiber access opening is configured to receive a cover. A plurality of covers, having a standard footprint configured to be received in the fiber access opening, include a connector free cover, a cover including a drop cable connector and/or a cover including a plurality of termination connectors. The drop cable connector and termination connectors include a back fiber connection member configured to receive the connectorized ends when positioned in the fiber access opening.

In other embodiments of the present invention, the housing is a wrap-around housing. The plurality of covers may be configured to be received in the opening and form an environmental seal with the housing and the apparatus may further include environmental seal members in the ends of the housing that provide an environmental seal between the optical fiber cable and the housing.

In further embodiments, the at least one optical fiber from the optical fiber cable extends within the housing with no loops therein. The connectorized ends of the at least one optical fiber may be an SC connector and/or an FC connector. The optical fiber termination apparatus may further include a splice chamber in the housing and the at least one optical fiber may extend from the optical fiber cable in the splice chamber to the severed fiber chamber. The splice chamber may be environmentally sealed from the severed fiber chamber. A splice tray may be positioned in the splice chamber that optically couples the connectorized ends to respective ones of the optical fibers in the optical fiber cable.

In other embodiments of the present invention, a bend control member is provided on at least one of the ends of the housing with the optical fiber cable extending therein. The bend control member(s) are configured to control a bend radius of the optical fiber cable entering the housing. The bend control member(s) may be tapered resilient members tapering from the housing to a selected position on the optical fiber cable displaced from the housing.

In yet further embodiments of the present invention, the at least one optical fiber is at least four optical fibers. The termination connectors may have a closable front fiber connection member on a face thereof extending from the housing and the severed fiber chamber may be environmentally sealed when the front fiber connection member is closed. A seal member may be positioned between each of the termination connectors and the cover including the termination connectors and the severed fiber chamber may be environmentally sealed by the seal member.

In other embodiments of the present invention, an optical fiber termination apparatus for taut sheath splicing includes a housing configured to be positioned around a section of an optical fiber cable with an uncut strength member of the optical fiber cable extending therethrough. The housing has a first opening at a first end thereof for receiving the optical fiber cable and a second opening at a longitudinally displaced second end thereof for receiving the optical fiber cable. A severed fiber chamber in the housing is configured to receive connectorized ends of at least one optical fiber from the optical fiber cable. A fiber access opening in a face of the housing between the first and second end of the housing opens to the severed fiber chamber. The fiber access opening is configured to receive a selected one of a plurality of covers, including a connector free cover, a cover including a drop cable connector and/or a cover including a plurality of termination connectors. The drop cable connector and termination connectors include a back fiber connection member configured to receive the connectorized ends when positioned in the fiber access opening.

In further embodiments of the present invention, an optical fiber termination apparatus for taut sheath splicing includes a housing configured to be positioned around a section of an optical fiber cable with an uncut strength member of the optical fiber cable extending therethrough. The housing has a first opening at a first end thereof for receiving the optical fiber cable and a second opening at a longitudinally displaced second end thereof for receiving the optical fiber cable. An optical fiber connector positioned in a wall of the housing optically couples an optical fiber from the optical fiber cable to a front fiber connection member of the optical fiber connector accessible from outside the housing.

In yet other embodiments of the present invention, the front fiber connection member is a closable front fiber connection member on a face of the optical fiber connector extending from the housing and the housing is environmentally sealed when the front fiber connection member is closed. The optical fiber connector may be a plurality of optical fiber connectors.

In other embodiments of the present invention, a factory preterminated optical fiber cable includes a plurality of the optical fiber termination apparatus as described above positioned at selected locations along a length thereof. The optical fiber cable is spooled with the optical fiber termination apparatus thereon.

In further embodiments of the present invention, an optical fiber termination kit for taut sheath splicing includes a plurality of covers having a standard footprint configured to be received in a fiber access opening of a housing having an uncut strength member of an optical fiber cable extending therethrough. The covers include at least a cover including a drop cable connector and/or a cover including a plurality of termination connectors. The drop cable connector and termination connectors include a back fiber connection member configured to receive a connectorized end of at least one optical fiber from the optical fiber cable when positioned in the fiber access opening.

In yet further embodiments of the present invention, methods of terminating optical fiber include positioning an optical fiber termination apparatus housing around a section of an optical fiber cable with an uncut strength member of the optical fiber cable extending therethrough. The housing has a first opening at a first end thereof for receiving the optical fiber cable and a second opening at a longitudinally displaced second end thereof for receiving the optical fiber cable and has a severed fiber chamber in the housing configured to receive connectorized ends of at least one optical fiber from the optical fiber cable and a fiber access opening in a face of the housing between the first and second end of the housing that opens to the severed fiber chamber, the fiber access opening being configured to receive a cover. A selected plurality of optical fibers are routed from the optical fiber cable to the severed fiber chamber. Ones of the routed optical fibers are preterminated with a standard end connector. As used herein, a standard end connector is an optical fiber connector in accordance with an industry standards group specification for such connectors, such as an SC or FC connector. One of a plurality of covers is selected, the covers having a standard footprint configured to be received in the fiber access opening, including a connector free cover, a cover including a drop cable connector and/or a cover including a plurality of termination connectors, wherein the drop cable connector and termination connectors include a back fiber connection member configured to receive the standard end connector when positioned in the fiber access opening. The standard end connectors of at least one of the optical fibers are coupled to a corresponding back fiber connector member and the selected cover is connected in the fiber access opening.

In some other embodiments of the present invention, selecting one of the plurality of covers includes selecting the connector free cover and coupling the connector free cover to the housing in the fiber access opening in a factory while preterminating the optical fiber cable and then selecting the cover including a drop cable connector or the cover including a plurality of termination connectors during deployment of the optical fiber cable. Connecting the selected cover may then include connecting the selected cover including a drop cable connector or a plurality of termination connectors during deployment of the optical fiber cable.

In yet further embodiments of the present invention, optical fiber termination apparatus for taut sheath splicing include a housing configured to enclose a section of an optical fiber cable with an uncut strength member of the optical fiber cable extending therethrough. A severed fiber chamber in the housing is configured to receive connectorized ends of at least one optical fiber from the optical fiber cable. The housing includes a fiber access opening. A plurality of covers are provided having a standard footprint configured to be received in the fiber access opening, including a connector free cover, a cover including a drop cable connector and/or a cover including a plurality of termination connectors. The drop cable connector and termination connectors include a back fiber connection member configured to receive the connectorized ends when positioned in the fiber access opening.

In further embodiments of the present invention, an optical fiber termination apparatus for taut sheath splicing includes a housing configured to be positioned around a section of an optical fiber cable with a plurality of uncut and un-looped optical fibers of the optical fiber cable extending therethrough. The housing may have a first opening at a first end thereof for receiving the optical fiber cable and a second opening at a longitudinally displaced second end thereof for receiving the optical fiber cable. A severed fiber chamber in the housing is configured to receive ends of at least one optical fiber from the optical fiber cable. A fiber access opening in a face of the housing between the first and second end of the housing opens to the severed fiber chamber. The fiber access opening is configured to receive a cover. A plurality of covers are provided having a standard footprint configured to be received in the fiber access opening, including a connector free cover, a cover including a drop cable connector and/or a cover including a plurality of termination connectors. The drop cable connector and termination connectors include an optical fiber connection point configured to optically couple to the ends of the at least one optical fiber when positioned in the fiber access opening.

In further embodiments of the present invention, optical fiber termination apparatus for taut sheath splicing include a housing configured to be positioned around a section of an optical fiber cable with a plurality of uncut and un-looped optical fibers of the optical fiber cable extending therethrough. The housing may have a first opening at a first end thereof for receiving the optical fiber cable and a second opening at a longitudinally displaced second end thereof for receiving the optical fiber cable. A severed fiber chamber in the housing is configured to receive ends of at least one optical fiber from the optical fiber cable. A fiber access opening in a face of the housing between the first and second end of the housing opens to the severed fiber chamber. The fiber access opening is configured to receive a selected one of a plurality of covers, including a connector free cover, a cover including a drop cable connector and/or a cover including a plurality of termination connectors, wherein the drop cable connector and termination connectors include an optical fiber connection point configured to optically couple to the ends of the at least one optical fiber when positioned in the fiber access opening.

In yet other embodiments of the present invention, optical fiber termination apparatus for taut sheath splicing include a housing configured to be positioned around a section of an optical fiber cable with a plurality of uncut and un-looped optical fibers of the optical fiber cable extending therethrough. The housing has a first opening at a first end thereof for receiving the optical fiber cable and a second opening at a longitudinally displaced second end thereof for receiving the optical fiber cable. An optical fiber connector positioned in a wall of the housing optically couples an optical fiber from the optical fiber cable to a front fiber connection member of the optical fiber connector accessible from outside the housing.

In further embodiments of the present invention, optical fiber termination kits for taut sheath splicing include a plurality of covers having a standard footprint configured to be received in a fiber access opening of a housing having a plurality of uncut and un-looped optical fibers of an optical fiber cable extending therethrough. The covers include t least a cover including a drop cable connector and/or a cover including a plurality of termination connectors. The drop cable connector and termination connectors include an optical fiber connection point configured to optically couple to ends of at least one optical fiber from the optical fiber cable when positioned in the fiber access opening.

In other embodiments of the present invention, methods of terminating optical fiber include positioning an optical fiber termination apparatus housing around a section of an optical fiber cable with a plurality of uncut and un-looped optical fibers of the optical fiber cable extending therethrough. The housing may have a first opening at a first end thereof for receiving the optical fiber cable and a second opening at a longitudinally displaced second end thereof for receiving the optical fiber cable. The housing has a severed fiber chamber therein configured to receive ends of at least one optical fiber from the optical fiber cable and a fiber access opening in a face of the housing between the first and second end of the housing that opens to the severed fiber chamber. The fiber access opening is configured to receive a cover. Ends of a selected plurality of optical fibers are routed from the optical fiber cable to the severed fiber chamber. One of a plurality of covers having a standard footprint configured to be received in the fiber access opening is selected. The covers include a connector free cover, a cover including a drop cable connector and/or a cover including a plurality of termination connectors. The drop cable connector and termination connectors include an optical fiber connection point configured to optically couple to the ends of the selected plurality of optical fibers when positioned in the fiber access opening. The ends of the selected plurality of the optical fibers are coupled to a corresponding optical fiber connection point and the selected cover is connected in the fiber access opening.

In yet further embodiments of the present invention, optical fiber termination apparatus for taut sheath splicing include a housing configured to enclose a section of an optical fiber cable with a plurality of uncut and un-looped optical fibers of the optical fiber cable extending therethrough. A severed fiber chamber in the housing is configured to receive ends of at least one optical fiber from the optical fiber cable. A fiber access opening is provided in the housing. A plurality of covers having a standard footprint configured to be received in the fiber access opening is provided, including a connector free cover, a cover including a drop cable connector and/or a cover including a plurality of termination connectors. The drop cable connector and termination connectors include an optical fiber connection point configured to optically couple to the ends of the at least one optical fiber when positioned in the fiber access opening.

While described generally above with reference to a taut sheath splice where an uncut strength member of the optical fiber cable extends through the housing, it will be understood that in other embodiments of the present invention a plurality of uncut and un-looped fibers of the optical fiber cable extend through the housing and the strength member may be cut. Similarly, embodiments described with reference to a plurality of uncut and un-looped fibers of the optical fiber cable extending in the housing may be provided instead or additionally with an uncut strength member of the optical fiber cable extending through the housing.

Embodiments of the present invention will now be further described with reference to the various embodiments illustrated in FIGS. 1-15. An optical fiber termination apparatus 100 according to some embodiments of the present invention will now be described with reference to the perspective illustrations of FIGS. 1-3. The optical fiber termination apparatus 100 includes a housing 105 that is configured to be positioned around the optical fiber cable 20 with an uncut strength member of the optical fiber cable 20 extending therethrough (i.e., a taut sheath splice). The housing 105 may, for example, be a wrap-around housing or a multi-piece housing that may be positioned around the optical fiber cable 20. The optical fiber cable 20 enters a first end of the housing 105 through a tapered bend control member 145a and exits through a longitudinally displaced (spaced apart) second end of the housing 105 through a bend control member 145b. The cover 110a has a standard footprint defined by an edge 111a configured to be received in a fiber access opening 120 in a face of the housing 105 between the first and second ends of the housing 105. The fiber access opening 120 opens to allow access to a severed fiber chamber 115 within the housing 105.

One or more optical fibers 130 from the optical fiber cable 20 extend into the severed fiber chamber 115 and are shown with standard connectors 125, on ends thereof (such as Telecommunications Industry Association (TIA) standard connectors). For example, SC-type connectors are shown as the connectors 125 in FIGS. 2 and 3. In other words, the optical fiber cable 20 may, for example, carry a total of 32 individual optical fibers and, for the embodiments illustrated in FIG. 3, four of the optical fibers are severed and have connectors 125 placed thereon and are positioned in the severed fiber chamber 115 during an in-factory pretermination operation for the optical fiber cable 20. Thus, the optical fiber cable 20 may enter through a first end of the housing 105 with 32 fibers extending therein, and exit through the second end with 28 optical fibers extending therein with subsequent reductions at downstream optical fiber termination apparatus 100 positioned at other selected locations on the optical fiber cable 20. Thus, an optical fiber cable 20 could be provided pre-terminated from the factory with a plurality of optical fiber termination apparatus 100 pre-installed thereon at locations selected to order.

Figure 2:
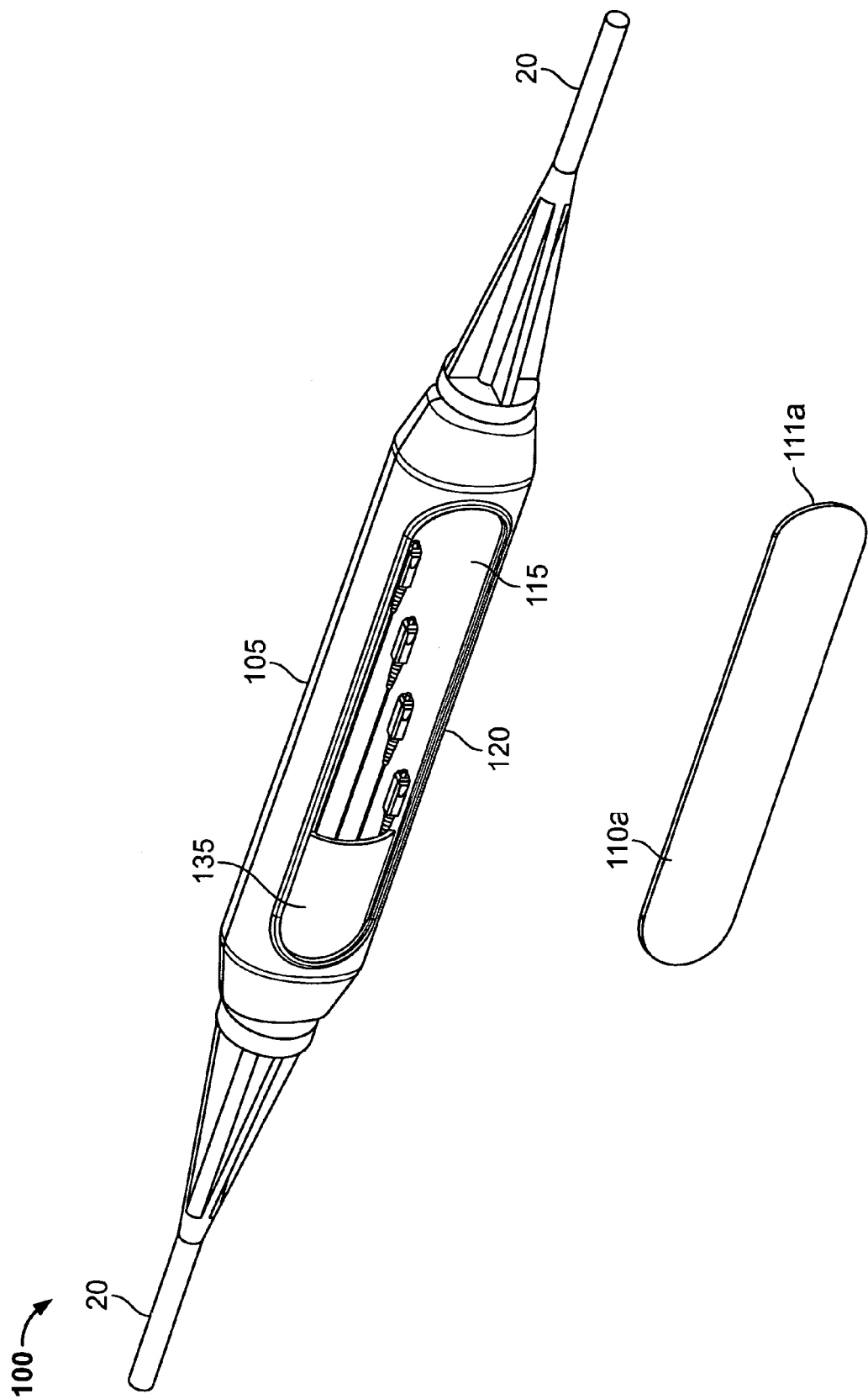
FIG. 2 is an exploded perspective view of the apparatus of FIG. 1.
Figure 3:
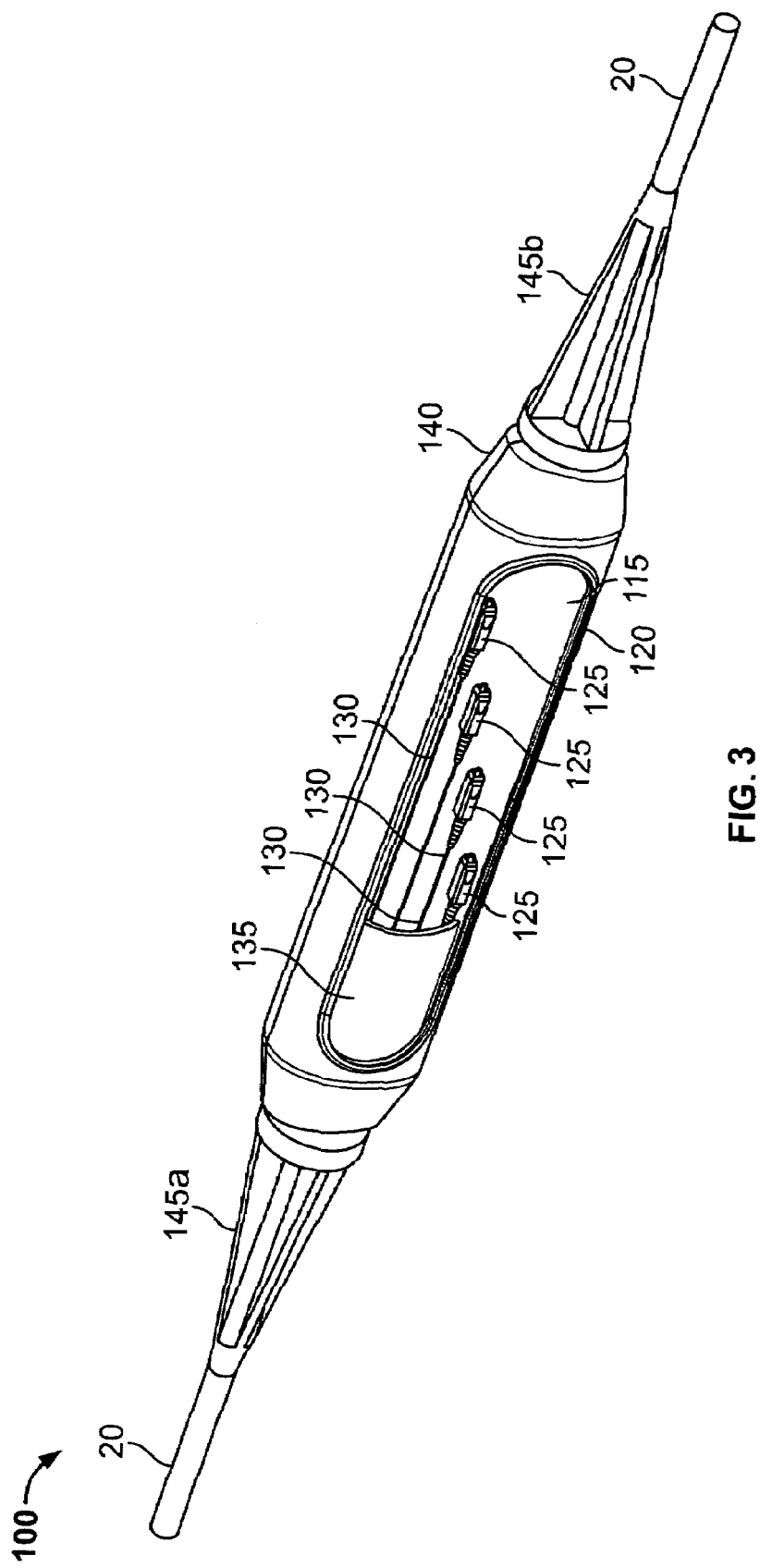
FIG. 3 is a perspective view showing an interior fiber chamber of the apparatus of FIG. 1.

Also shown in the embodiments of FIGS. 2 and 3 is a second chamber 135 that may be environmentally isolated from the severed fiber chamber 115. Thus, the strength member and/or non-severed fibers of the optical fiber cable 20 and any splicing occurring in the housing 105 may be maintained in an environmentally sealed condition even after the cover 110a is removed from the housing 105 to allow access to the severed fiber chamber 115. As also shown in FIG. 3, rather than positioning the sealed separate chamber 135 at an end of the housing 105, a separate chamber may be provided on a backside 140 of the housing.

In some embodiments of the present invention, where an environmentally sealed housing 105 is desired, the cover 110a may be sealed in the opening 120 to environmentally enclose the severed fiber chamber 115 when the cover 110a is positioned on the housing 105. It will be understood that, in some embodiments, such as free-flow air-mounted embodiments, the cover 110a may be positioned in the opening 120 without environmental sealing thereto and further that the separate chamber 135 may be a non-environmentally sealed chamber or may not be provided as a separate chamber and the remaining optical fibers, strength member and the like contained within the housing 105 may all be positioned in the severed fiber chamber 115 along with the optical fibers 130 having the connector 125 on ends thereof.

The bend control members 145a and 145b may be beneficially included in some embodiments of the present invention to provide for tapering over a length of the optical fiber 20 extending from each end of the housing 105 of the bending of the optical fibers 130 within the optical fiber cable 20. This may be beneficial in limiting or preventing damage to optical fibers extending in the optical fiber cable 20 by controlling bending of those fibers below a minimum bend radius specified for the fibers.

The housing 105, in some embodiments, may be provided in a relatively trim, low-profile version without including any fiber loops in the optical fibers 130 within the housing 105. In such embodiments, the lower profile may allow for easier rolling of a preterminated cable 20 onto spools or the like for delivery and installation/deployment in the field. However, as will be described further herein, larger versions of the housing also may be utilized that are large enough to accommodate a loop of optical fiber without damaging the fiber by controlling a minimum bend radius thereof and may further include a splice tray for splicing and the like.

As will also be further described later herein, while the bend control members 145a, 145b may be utilized to provide environmental sealing at the ends of the housing 105 for environmentally sealed optical fiber termination apparatus embodiments, sealing may instead be provided at by a seal interior to the housing from the bend control members 145a, 145b.

The cover 110a may be replaced either during pretermination in the factory, and/or during installation and/or as needed in the field by a cover including a drop cable connector and/or a cover including a plurality of termination connectors or the like. Optical fiber coupling to such a drop cable and/or plurality of termination connectors may be provided by coupling the connectors 125 into a back fiber connection member of the drop cable connector and/or termination connectors configured to receive the connectorized ends 125 of the individual optical fibers from the optical fiber cable 20.

Various benefits may be provided in some embodiments of the present invention by using optical fiber termination apparatus for taut sheath splicing as described herein. In particular, by optionally delaying installation of the termination connectors or dropped cable and utilizing effectively factory-installed termination system approaches, the pre-installation cost for an optical fiber communications network may be reduced. In addition, more limited qualification and performance testing for the various components may be provided and both field- or factory-installable embodiments may be utilized. A simplified standardized footprint for the covers may be provided while otherwise allowing flexibility in configuration when subsequent termination connectors or drop cables are added. In some instances, where planned connection points are ultimately not utilized, the additional terminal costs may be totally avoided. In addition, a variety of different standard connectors 125 may be used at the ends of severed optical fibers as desired or requested by particular customers for either field-installable or factory preterminated embodiments. In addition, as described above, both environmentally sealed and free breathing variations may be provided for different field installed environments or the like.

Further embodiments of the present invention will now be described with reference to the perspective view illustrations of FIGS. 4A through 4D. As shown in FIG. 4A, an optical fiber termination apparatus 200 for taut sheath splicing is positioned on an optical fiber cable 20. The optical fiber termination apparatus 200 includes a housing 205 and a cover 210a including a drop cable connector 247 with a drop cable 249 extending therefrom. As shown in FIG. 4B, the cover assembly 212a including a cover 210a with standard footprint defined by an edge 211a for receiving in an opening in the housing 205 includes a drop cable connector 247 therein having a backside fiber connection member configured to receive the connector 125 and optically couple the fiber 130 with one or more optical fibers extending in the drop cable 249. As shown in FIG. 4A, bend control members 245 may be provided on ends of the housing 205 as described with reference to the embodiments of FIGS. 1 through 3.

As seen in FIGS. 4C and 4D, the optical fiber termination apparatus 200 may also be configured by use of a cover assembly 212b including a plurality of termination connectors 251, such as OpticTap™ connectors, that may themselves be environmentally sealed. The termination connectors 251 may be received in termination connector mounting extensions 253, which may provide an environmentally sealed coupling for the termination connector 251 in the cover assembly 212b. As with the drop cable connector cover assembly 212a, a back fiber connection member is provided in connectors, such as the OpticTap™, that is configured to receive the connectors 125 of the optical fibers in the severed fiber chamber 115.

Various embodiments of the present invention are further illustrated in FIGS. 5 and 6. As shown in FIGS. 5 and 6, an optical fiber termination apparatus 300 includes a housing 305 configured to be positioned around a section of the optical fiber cable 20 with an uncut strength member of the optical fiber cable 20 extending therethrough from a first end to a second longitudinally displaced end of the housing 305. The interior of the housing 305 may be generally configured as described with reference to the embodiments of FIGS. 1 through 3. A plurality of different covers coupled to a fiber access opening in the housing have a standard footprint for receiving in the fiber access opening of the housing 305. In FIG. 5, a cover 310b including a plurality of the termination connectors 251 is shown. In FIG. 6, a cover 310a including a drop cable connector 247 with a drop cable 249 extending therefrom is shown. Also shown in FIGS. 5 and 6 are bend control members 345 on respective ends of the housing 305.

Figures 7A, 7B:
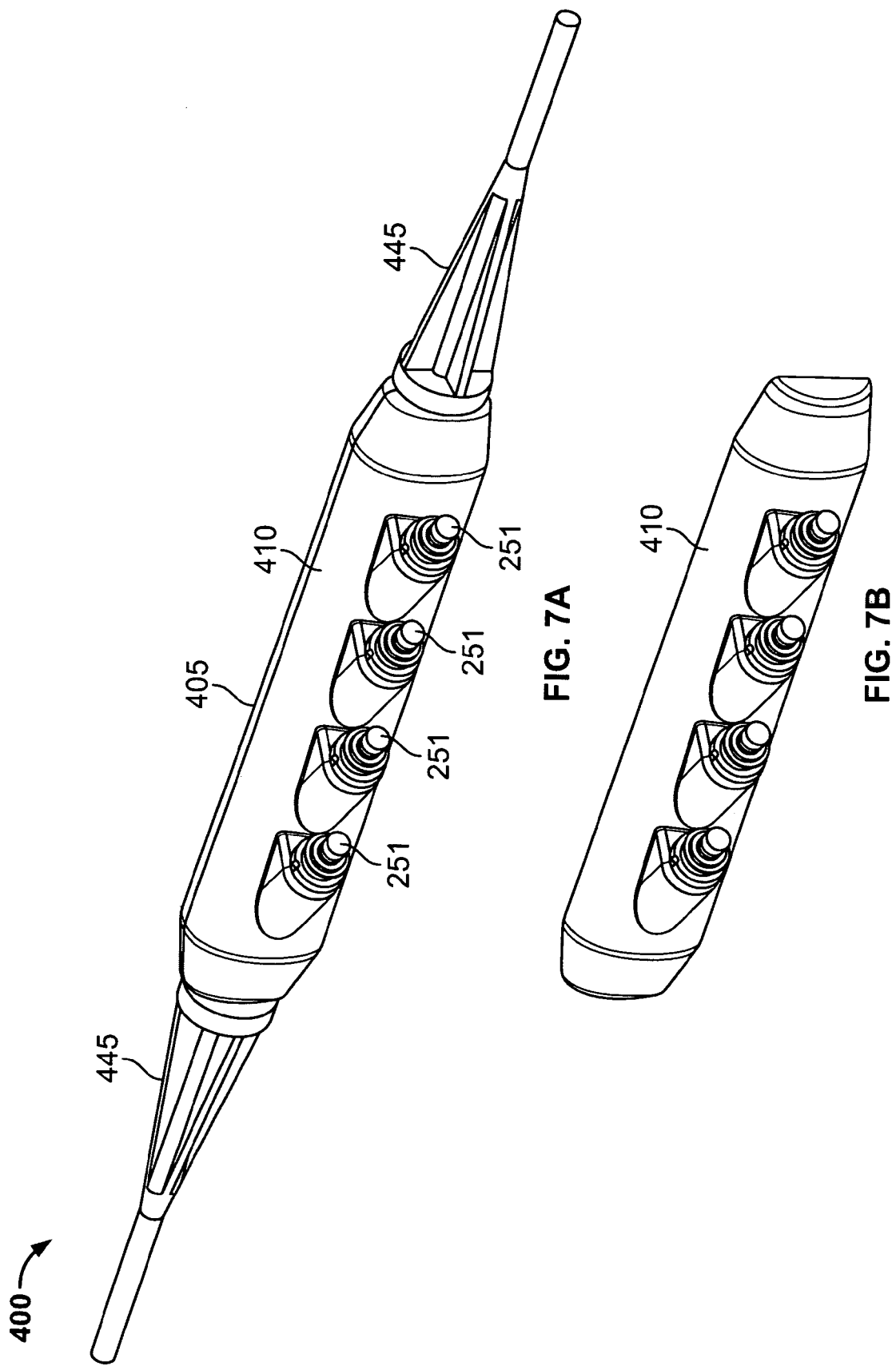
FIGS. 7A and 7B are perspective views of an optical fiber termination apparatus according to some embodiments of the present invention.

Further embodiments of the present invention are illustrated in FIGS. 7A and 7B. As seen in FIGS. 7A and 7B, the optical fiber termination apparatus 400 for taut sheath splicing includes a housing 405 configured to be positioned around a section of the optical fiber cable 20 with an uncut strength member of the optical fiber cable 20 extending therethrough from a first end to a second end of the housing 405. An interior of the housing 405 may be configured generally as described previously with reference to the embodiments of FIGS. 1 through 3. The embodiments of FIGS. 7A and 7B are shown including a cover 410 including a plurality of termination connectors 251 mounted therein. The embodiments of FIGS. 7A and 7B differ from the previously described embodiments in that the cover 410 extends the entire length of and generally defines half of the housing 405 rather than being positioned in an opening intermediate the longitudinally displaced ends of the housing 405.

Further embodiments of the present invention are illustrated in FIG. 8. For the embodiments of FIG. 8, the optical fiber termination apparatus 500 may be factory pre-installed with a housing 505 including a plurality of termination connectors 251 therein. Thus, in some embodiments of the present invention, the optical fiber termination apparatus 500 is preterminated at the factory with the connectors 251 therein rather than utilizing a blank cover that may be interchangeably and selectably swapped with a termination connector cover, a drop cable cover, or the like. It will be understood that the embodiments described with reference to FIGS. 7A and 7B may likewise be predefined and factory terminated rather than utilized as subsequent field installable optional covers coupled to a housing 405.

Further embodiments of the present invention will now be described with reference to FIGS. 9A through 9D. As shown in FIGS. 9A through 9D, an optical fiber termination apparatus 600 for taut sheath splicing includes a housing 605 configured to be positioned around a section of the optical fiber cable 20 with an uncut strength member 663 of the optical fiber cable 20 extending therethrough. A first opening 657 is provided at a first end of the housing 605 to receive the optical fiber cable 20 and a second opening 657' is provided at a longitudinally displaced second end of the housing 605 from which the optical fiber cable 20 extends. A cover 610a, which is shown as a connector free cover in FIG. 9A, is positioned in a fiber access opening 620 having a standard footprint configured to receive the cover 610a and other connectorized covers, which opening provides access to a severed fiber chamber 615 within the housing 605. A plurality of optical fibers 630 with connectors 625 on ends thereof are shown in the spliced chamber 615. As shown in FIG. 9B, a total of four connectors 625 and fibers 630 extend into the severed fiber chamber 615. Such an arrangement corresponds with the exemplary four-connector embodiments described previously. However, other arrangements may be provided in accordance with embodiments of the present invention, for example, as illustrated in FIG. 9C, where eight connectors 625 are provided on eight optical fibers 630 extending into the severed fiber chamber 615.

Referring now to FIG. 9D, the front portion of the housing 605 has been removed to reveal a back chamber 640 configured to receive the uncut strength member 663 and optical fibers extending through the housing 605 therein. Also shown in the back chamber 640, is a splice tray 660 that may be utilized to provide splices for the optical fibers 630 extended from the back chamber 640 into the severed fiber chamber 115. Thus, the back chamber 640 may provide a splice chamber that may be environmentally isolated from the severed fiber chamber 615.

As also shown in the embodiments of FIG. 9D, a first end wall 667 of the housing 605 is configured to receive an environmental sealing member 665, such as a grommet, in an opening therein. The uncut strength member 663 and optical fibers from the optical fiber cable 20 extend through an interior opening or openings of the environmental seal member 665. Thus, the environmental seal member 665 may provide for environmental sealing of the housing 605 including the splice chamber 640 and the severed fiber chamber 615. Similarly, a second end wall 667' and environmental seal member 665' are shown in a second end of the housing 605 longitudinally displaced from the first end.

Further embodiments of the present invention will now be described with referenced to FIGS. 10 and 11. As shown in the embodiments of FIGS. 10 and 11, an optical fiber termination apparatus 700 includes a housing 705 configured to be positioned around a section of the optical fiber cable 20. A cover 710 is positioned over a fiber access opening to a severed fiber chamber, which may be arranged within the housing 705 in a manner similar to that described with reference to embodiments previously described herein. As shown for the particular embodiments illustrated in FIG. 11, ends of eight optical fibers 730 with connectors 725 thereon extend into a severed fiber chamber 715. Also shown in the embodiments of FIG. 11 are first and second retaining bars 727 positioned in the severed fiber chamber 715 and receiving the respective connector 725 therein. Thus, positioning and movement of the cable 730 and connectors 725 before installation thereof into the back end of a drop cable or termination connector may be controlled within the severed fiber chamber 715. While shown as an arrangement of eight optical fiber 730 in FIG. 11, other combinations may be provided as described previously herein including a lesser or greater number of optical fibers 730 extending into the severed fiber chamber 715.

Further embodiments of the present invention will now be described with reference to FIG. 12. As shown in the perspective view of FIG. 12, an optical fiber termination apparatus 800 includes a splice chamber 840 with an uncut strength member 863 of the optical fiber cable 20 extending therethrough. A splice tray 860 for splicing to optical fibers from the optical fiber cable 20 before routing the same to a severed fiber chamber is also shown in FIG. 12. The splice chamber 840 includes a respective first end wall 867 and second end wall 867' for sealingly receiving respective sealing members 865 and 865' extending therein to provide sealing around the strength member 863 and optical fibers extending into the splice chamber and sealing to the end walls 867, 867' so that the splice chamber may be environmentally sealed in some embodiments of the present invention. The end walls 867, 867' may extend through a front side severed fiber chamber and the environmental sealing members 865, 865' may also provide for environmental sealing of the severed fiber chamber.

Further embodiments of the present invention are shown in FIGS. 13A through 13E. As shown in FIGS. 13A through 13E, an optical fiber termination apparatus 900 includes a housing 905 configured to be positioned around a section of the optical fiber cable 20 and a cover 910a, 910b, 910c having a standard footprint configured to be received in a fiber access opening into the housing 905. Illustrated in FIG. 13A is a connector-free cover 910a. Illustrated in FIG. 13B and further in FIGS. 13C, is a cover 910b including a plurality of termination connectors 251. Shown in FIGS. 13D and 13E is a cover 910c including a drop cable connector 947 having a drop cable 949 extending therefrom. Thus, one of a plurality of different covers 910a, 910b, 910c may be selectively positioned in a fiber access opening of the housing 905 to provide a desired configuration for the optical fiber termination apparatus 900.

Further embodiments of the present invention will now be described with reference to FIGS. 14A and 14B. As shown in the embodiments of FIGS. 14A and 14B, an optical fiber termination apparatus 1000 includes a housing 1005 configured to be positioned around a section of the optical fiber cable 20. The optical fiber termination apparatus 1000 includes cover 1010a, 1010b having a standard footprint configured to be received in a fiber access opening of the housing 1005. As shown in FIG. 14A, the cover 1010b includes a plurality of termination connectors 251. As shown in the embodiments of FIG. 14B, the cover 1010a includes a drop cable connector 1047 with a drop cable 1049 extending therefrom. As also shown in FIG. 14A, a cap 251' may be provided on each of the connectors 251 to cover and environmentally seal a front side fiber connection member of the connectors 251 when no mating drop cable terminator is installed in the front fiber connection member.

Figure 15:
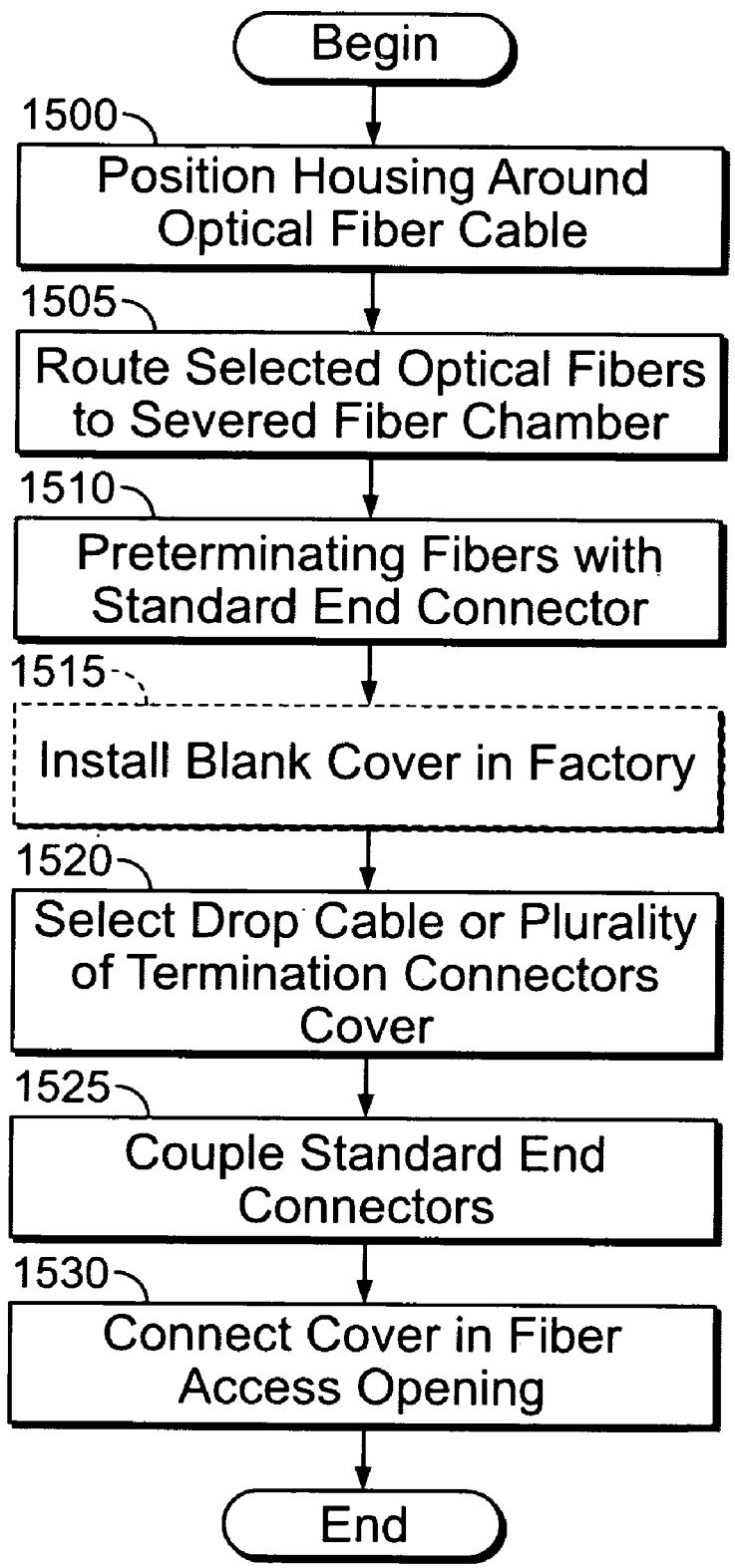
FIG. 15 is a flowchart illustrating operations for terminating optical fibers according to some embodiments of the present invention;.

Methods of terminating optical fibers according to some embodiments of the present invention will now be described with reference to the flowchart illustration of FIG. 15. As seen in FIG. 15, operations begin at Block 1500 by positioning an optical fiber termination apparatus housing, such as described above, around a section of the optical fiber cable 20 with an uncut strength member of the optical fiber cable 20 extending therethrough. A selected plurality of optical fibers are routed from the optical fiber cable 20 to a severed fiber chamber (Block 1505). Ones of the routed optical fibers are preterminated with a standard end connector (Block 1510). As shown in the embodiments of FIG. 15, a blank cover, with no termination connectors thereon, may be placed over the fiber access opening of the housing in the factory while preterminating an optical fiber cable before the optical fiber cable, including one or more of the housings, is deployed in the field (Block 1515).

A cover having a standard footprint configured to be received in the fiber access opening is selected, either a cover including a drop cable connector or a cover including a plurality of termination connectors (Block 1520). Where a blank cover is installed in a factory at Block 1515, the drop cable or connector cover may be selected and installed during and/or after deployment of the optical fiber cable in place of the previously installed blank cover. The standard end connectors of at least one of the optical fibers are coupled to a corresponding back fiber connector member of the drop cable connector or termination connectors (Block 1525). The selected cover is connected to the housing in the fiber access opening (Block 1530).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An optical fiber termination apparatus for taut sheath splicing, comprising:
    a housing configured to be positioned around a section of an optical fiber cable with an uncut strength member of the optical fiber cable and/or a plurality of uncut and un-looped fibers of the optical fiber cable extending therethrough, the housing having a first opening at a first end thereof for receiving the optical fiber cable and a second opening at a longitudinally displaced second end thereof for receiving the optical fiber cable;
    a severed fiber chamber in the housing configured to receive ends of at least one optical fiber from the optical fiber cable;
    a fiber access opening in a face of the housing between the first and second end of the housing that opens to the severed fiber chamber, the fiber access opening being configured to interchangeably receive one of a plurality of differently configured covers; and
    the plurality of covers, each having a standard footprint configured to be interchangeably received in the fiber access opening, including a connector free first cover, a second cover including a drop cable connector and/or a third cover including a plurality of termination connectors, wherein the drop cable connector and termination connectors include a back fiber connection member configured to receive the ends when positioned in the fiber access opening.

2. The optical fiber termination apparatus of claim 1, wherein the ends of the at least one optical fiber from the optical fiber cable are connectorized ends.

3. The optical fiber termination apparatus of claim 1, wherein the housing comprises a wrap-around housing.

4. The optical fiber termination apparatus of claim 1, wherein the plurality of covers are configured to be received in the opening and form an environmental seal with the housing and wherein the apparatus further comprises environmental seal members in the ends of the housing that provide an environmental seal between the optical fiber cable and the housing.

5. The optical fiber termination apparatus of claim 1, wherein the at least one optical fiber from the optical fiber cable extends within the housing with no loops therein.

6. The optical fiber termination apparatus of claim 1, wherein the connectorized ends of the at least one optical fiber comprises a SC connector and/or a FC connector.

7. The optical fiber termination apparatus of claim 1, further comprising:
    a splice chamber in the housing, the at least one optical fiber extending from the optical fiber cable in the splice chamber to the severed fiber chamber, wherein the splice chamber is environmentally sealed from the severed fiber chamber.

8. The optical fiber termination apparatus of claim 7, further comprising a splice tray positioned in the splice chamber that optically couples the connectorized ends to respective ones of the optical fibers in the optical fiber cable.

9. The optical fiber termination apparatus of claim 1, further comprising a bend control member on at least one of the ends of the housing with the optical fiber cable extending therein, wherein the bend control member being configured to control a bend radius of the optical fiber cable entering the housing.

10. The optical fiber termination apparatus of claim 9, wherein the bend control member comprises a tapered resilient member tapering from the housing to a selected position on the optical fiber cable displaced from the housing.

11. The optical fiber termination apparatus of claim 1, wherein the at least one optical fiber comprises at least four optical fibers.

12. The optical fiber termination apparatus of claim 1 wherein the plurality of covers includes a cover including a plurality of termination connectors and wherein the termination connectors have a closable front fiber connection member on a face thereof extending from the housing and wherein the severed fiber chamber is environmentally sealed when the front fiber connection member is closed.

13. The optical fiber termination apparatus of claim 12 further comprising a seal member positioned between each of the termination connectors and the cover including a plurality of termination connectors and wherein the severed fiber chamber is environmentally sealed by the seal member.

14. An optical fiber termination apparatus for taut sheath splicing, comprising:
a housing configured to be positioned around a section of an optical fiber cable with an uncut strength member of the optical fiber cable and/or a plurality of uncut and un-looped fibers of the optical fiber cable extending therethrough, the housing having a first opening at a first end thereof for receiving the optical fiber cable and a second opening at a longitudinally displaced second end thereof for receiving the optical fiber cable;
a severed fiber chamber in the housing configured to receive ends of at least one optical fiber from the optical fiber cable;
a fiber access opening in a face of the housing between the first and second end of the housing that opens to the severed fiber chamber, the fiber access opening being configured to and second end of the housing that opens to the severed fiber chamber, the fiber access opening being configured to interchangeably receive each of a plurality of differently configured covers, including a connector free first cover, a second cover including a drop cable connector and/or a third cover including a plurality of termination connectors, wherein the drop cable connector and termination connectors include a back fiber connection member configured to receive the ends when positioned in the fiber access opening.

15. The optical fiber termination apparatus of claim 14, wherein the ends of the at least one optical fiber from the optical fiber cable are connectorized ends.

16. A factory preterminated optical fiber cable including a plurality of optical fiber termination apparatus for taut sheath splicing positioned at selected locations along a length thereof, the optical fiber cable being spooled with the optical fiber termination apparatus thereon, each of the optical fiber termination apparatus comprising:
a housing configured to be positioned around a section of an optical fiber cable with an uncut strength member of the optical fiber cable and/or a plurality of uncut and un-looped fibers of the optical fiber cable extending therethrough, the housing having a first opening at a first end thereof for receiving the optical fiber cable and a second opening at a longitudinally displaced second end thereof for receiving the optical fiber cable;
an optical fiber connector positioned in a wall of the housing and optically coupling an optical fiber from the optical fiber cable to a front fiber connection member of the optical fiber connector accessible from outside the housing.

17. The optical fiber termination apparatus of claim 16, wherein the front fiber connection member comprises a closable front fiber connection member on a face of the optical fiber connector extending from the housing and wherein the housing is environmentally sealed when the front fiber connection member is closed.

18. The optical fiber termination apparatus of claim 16 wherein the optical fiber connector comprises a plurality of optical fiber connectors.

19. An optical fiber termination kit for taut sheath splicing, comprising:
a plurality of differently configured covers having a standard footprint configured to be interchangeably received in a fiber access opening of a housing having an uncut strength member of the optical fiber cable and/or a plurality of uncut and un-looped fibers of the optical fiber cable extending therethrough, the covers including at least a first cover including a drop cable connector and/or a second cover including a plurality of termination connectors, wherein the drop cable connector and termination connectors include a back fiber connection member configured to receive an end of at least one optical fiber from the optical fiber cable when positioned in the fiber access opening.

20. The optical fiber termination kit of claim 19, wherein the end of the at least one optical fiber from the optical fiber cable is a connectorized end.

21. A method of terminating optical fiber comprising:
positioning an optical fiber termination apparatus housing around a section of an optical fiber cable with an uncut strength member of the optical fiber cable and/or a plurality of uncut and un-looped fibers of the optical fiber cable extending therethrough, the housing having a first opening at a first end thereof for receiving the optical Fiber cable and a second opening at a longitudinally displaced second end thereof for receiving the optical fiber cable and having a severed fiber chamber in the housing configured to receive ends of at least one optical fiber from the optical fiber cable and a fiber access opening in a face of the housing between the first and second end of the housing that opens to the severed fiber chamber, the fiber access opening being configured to interchangeably receive one of a plurality of differently configured covers;
routing a selected plurality of optical fibers from the optical fiber cable to the severed fiber chamber;
preterminating ones of the routed optical fibers with a standard end connector;
selecting one of the plurality of covers having a standard footprint configured to be received in the fiber access opening, including a connector free first cover, a second cover including a drop cable connector and/or a third cover including a plurality of termination connectors, wherein the drop cable connector and termination connectors include a back fiber connection member configured to receive the standard end connector when positioned in the fiber access opening;
coupling the standard end connectors of at least one of the optical fibers to a corresponding back fiber connector member; and
connecting the selected cover in the fiber access opening.

22. The method of claim 21 wherein selecting one of the plurality of covers comprises:
selecting the connector free cover and coupling the connector free cover to the housing in the fiber access opening in a factory while preterminating the optical fiber cable; and then
selecting the cover including a drop cable connector or the cover including a plurality of termination connectors during deployment of the optical fiber cable; and
wherein connecting the selected cover comprises connecting the selected cover including a drop cable connector or a plurality of termination connectors during deployment of the optical fiber cable.

23. An optical fiber termination apparatus for taut sheath splicing, comprising:
a housing configured to enclose a section of an optical fiber cable with an uncut strength member of the optical fiber cable and/or a plurality of uncut and un-looped fibers of the optical fiber cable extending therethrough;

a severed fiber chamber in the housing configured to receive ends of at least one optical Fiber from the optical fiber cable;
a fiber access opening in the housing; and
a plurality of differently configured covers having a standard footprint configured to be interchangeably received in the fiber access opening, including a connector free first cover, a second cover including a drop cable connector and/or a third cover including a plurality of termination connectors, wherein the drop cable connector and termination connectors include a back fiber connection member configured to receive the ends when positioned in the fiber access opening.

24. The optical fiber termination apparatus of claim 23, wherein the ends of the at least one optical fiber from the optical fiber cable are connectorized ends.

* * * * *

UNITED STATES PATENT AND TRADEMARK OFFICE
CERTIFICATE OF CORRECTION

PATENT NO. : 7,359,613 B2
APPLICATION NO. : 11/438559
DATED : April 15, 2008
INVENTOR(S) : Mullaney et al.

It is certified that error appears in the above-identified patent and that said Letters Patent is hereby corrected as shown below:

Column 15, Claim 14, Lines 22-24: Please delete the repetition "and second end of the housing that opens to the severed fiber chamber, the fiber access opening being configured to"

Signed and Sealed this

Sixteenth Day of September, 2008

JON W. DUDAS
*Director of the United States Patent and Trademark Office*